Dec. 5, 1950 E. F. JIRSA ET AL 2,532,552
SPEED CONTROL MEANS FOR HYDRAULIC MECHANISMS
Filed Nov. 5, 1945 7 Sheets-Sheet 1

INVENTORS
EMIL F. JIRSA, MERLIN HANSEN
CECIL W. BOPP
BY
ATTORNEYS

Dec. 5, 1950  E. F. JIRSA ET AL  2,532,552
SPEED CONTROL MEANS FOR HYDRAULIC MECHANISMS
Filed Nov. 5, 1945  7 Sheets-Sheet 2

INVENTORS
EMIL F. JIRSA, MERLIN HANSEN
CECIL W. BOPP
BY
ATTORNEYS

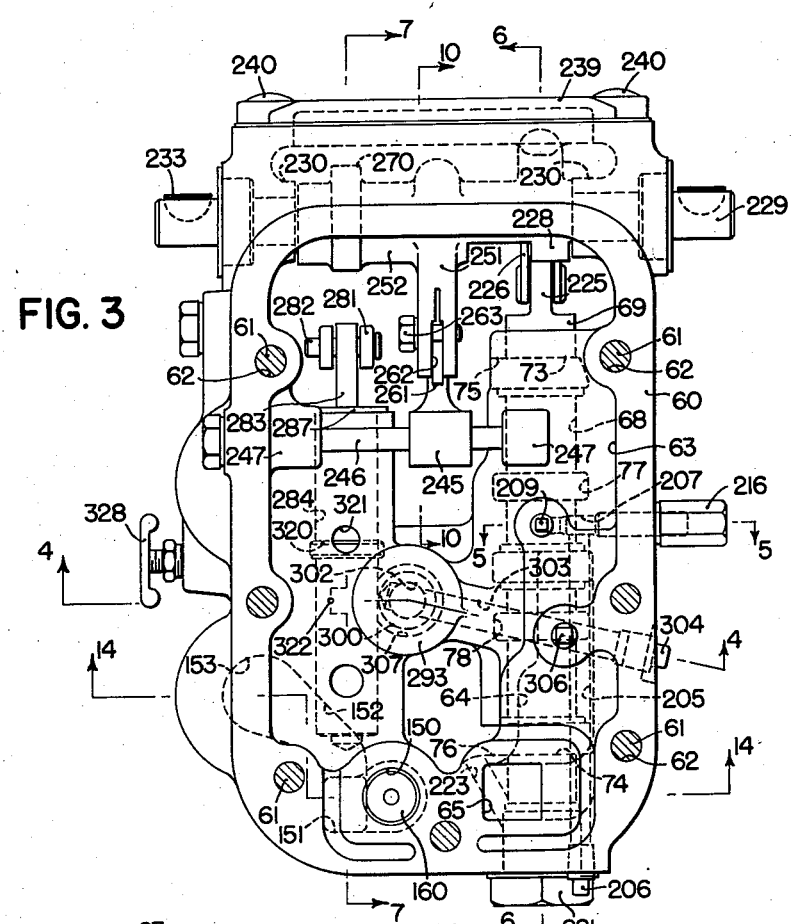
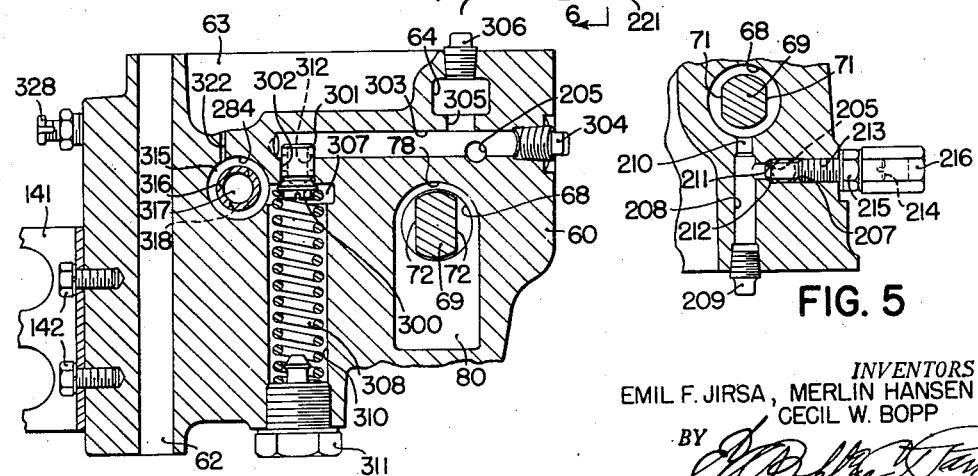

Dec. 5, 1950     E. F. JIRSA ET AL     2,532,552
SPEED CONTROL MEANS FOR HYDRAULIC MECHANISMS
Filed Nov. 5, 1945                                                      7 Sheets-Sheet 4
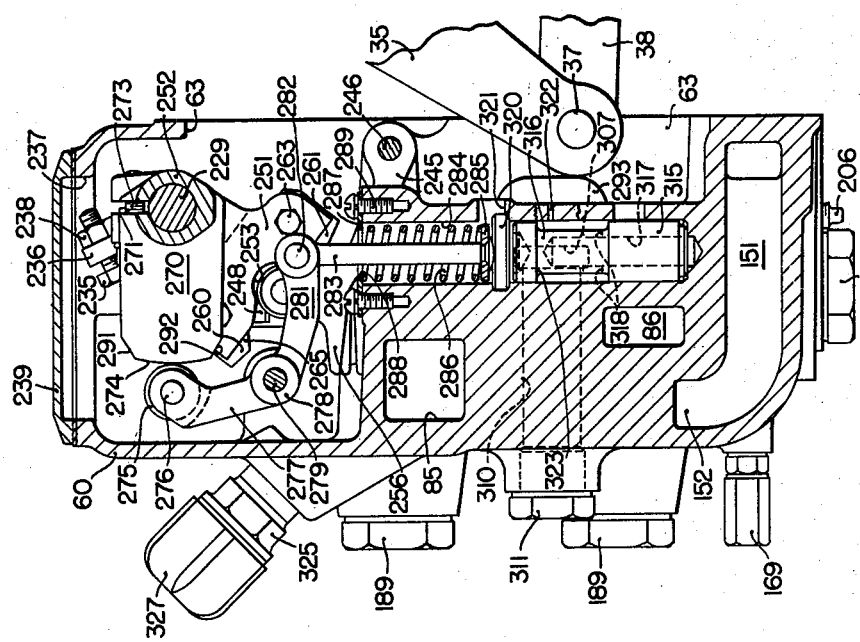
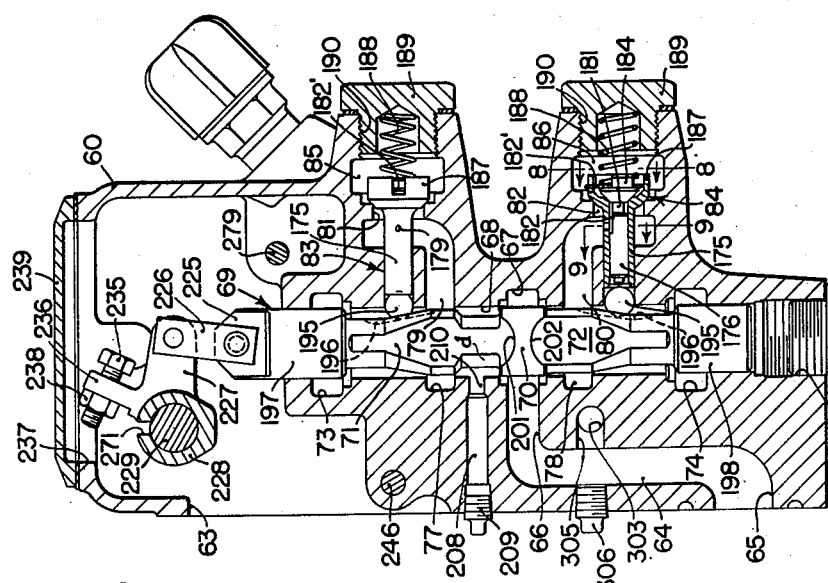
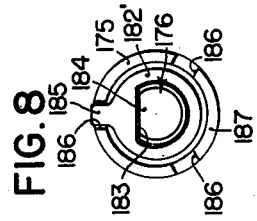
*INVENTORS.*
EMIL F. JIRSA, MERLIN HANSEN
CECIL W. BOPP
BY
ATTORNEYS Dec. 5, 1950   E. F. JIRSA ET AL   2,532,552
SPEED CONTROL MEANS FOR HYDRAULIC MECHANISMS
Filed Nov. 5, 1945   7 Sheets-Sheet 5
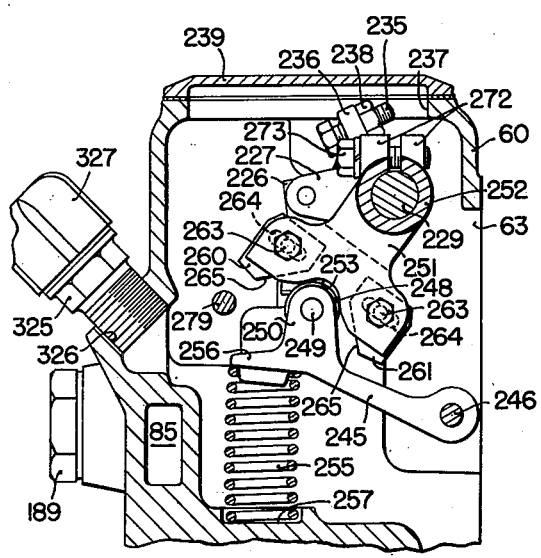
FIG. 10
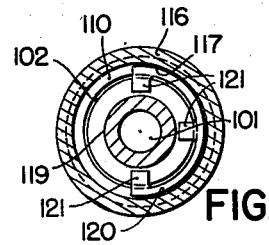
FIG. 12
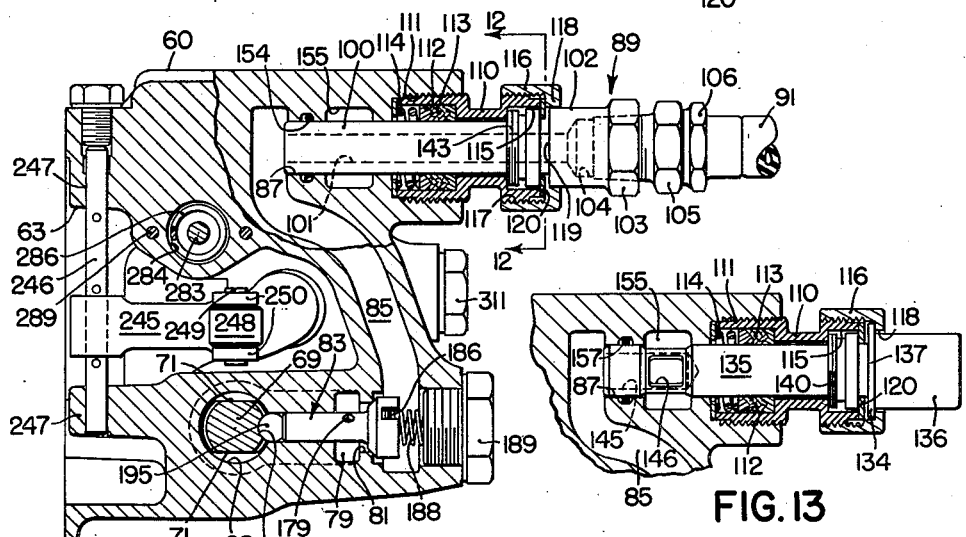
FIG. 11
FIG. 13
INVENTORS.
EMIL F. JIRSA, MERLIN HANSEN
CECIL W. BOPP
BY
ATTORNEYS

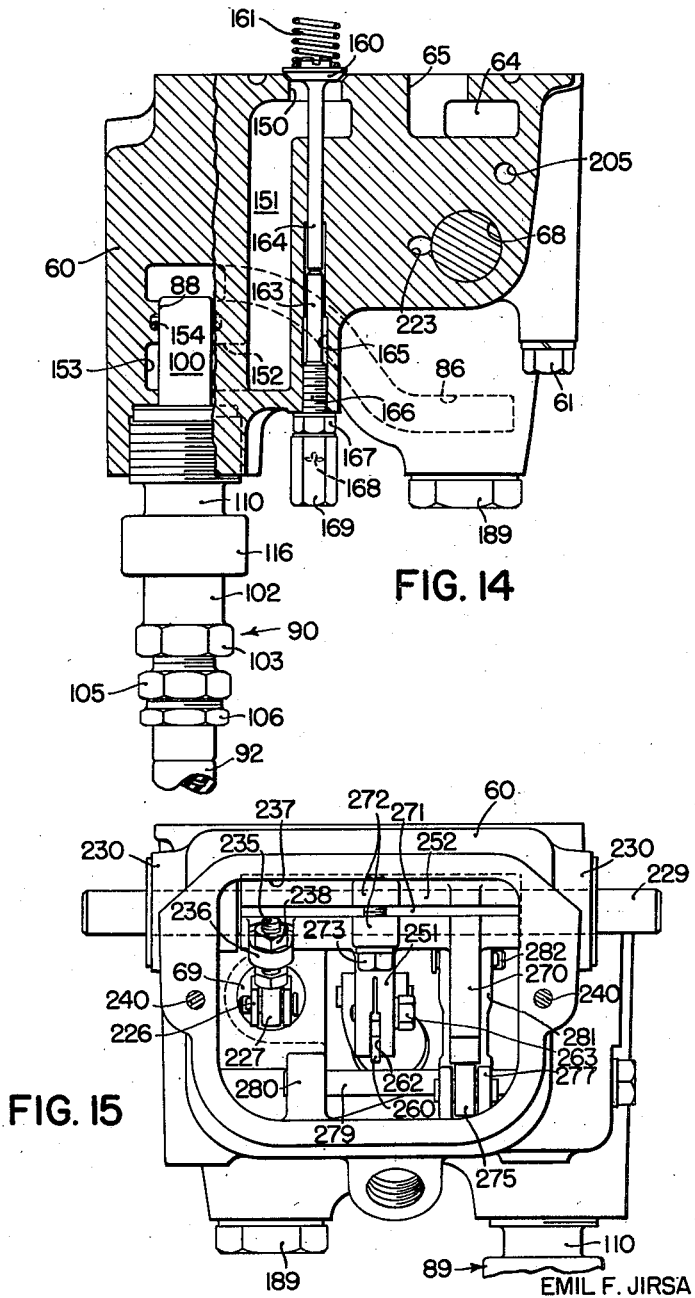

Patented Dec. 5, 1950

2,532,552

UNITED STATES PATENT OFFICE 2,532,552

SPEED CONTROL MEANS FOR HYDRAULIC MECHANISMS

Emil F. Jirsa, Merlin Hansen, and Cecil W. Bopp, Waterloo, Iowa, assignors to Deere Manufacturing Co., a corporation of Iowa Application November 5, 1945, Serial No. 626,626

8 Claims. (Cl. 121—46.5)

The present invention relates generally to hydraulic apparatus and is particularly well adapted for use in hydraulic control mechanism on tractors for raising, lowering, and adjusting implements mounted on the tractor or otherwise associated therewith, and has for its principal object the provision of a novel and improved hydraulic control mechanism that is more flexibly adapted to the various control requirements of modern implements.

Experience has indicated that for implements mounted directly upon a tractor, the most desirable type of hydraulic control mechanism is that which includes a control rockshaft mounted transversely at the rear of the tractor, with an actuating cylinder mounted inside of the housing and connected to the rockshaft by internal connections. It has also been found that the most convenient type of control for implements drawn behind a tractor includes a portable hydraulic cylinder which can be quickly and easily mounted on the implement drawbar near the draft connection to the tractor, with a flexible hose or hoses connecting the cylinder with the hydraulic control mechanism on the tractor. Heretofore, however, hydraulic control systems adapted for either rockshaft or remote cylinder control operations, involved considerable difficulties in converting the system from one type of operation to the other, in disconnecting the remote cylinder when the rockshaft was to be used and in locking out the integral cylinder when the remote cylinder was to be used. Such prior systems required considerable time for instructing untrained operators to properly attend to all of the various steps necessary in making a conversion.

In control systems of the class employed for adjusting implements, it is desirable that the mechanism operate quickly in raising the plow, cultivator, or other implement out of the ground at the end of the row or furrow preparatory to making a turn, but it is also desirable that the mechanism operate slowly when an implement is being adjusted from one depth of operation to another. Therefore, it is still another object of the present invention to provide a hydraulic control mechanism which has more than one speed of operation. A related object has to do with providing low and high speeds of operation in either direction of movement of the piston in the cylinder, either for single acting cylinders or cylinders of the double acting type.

Control for this mechanism is centered in a single control lever which can be swung from a central neutral position in either direction, to raise and lower the implement, respectively. The control mechanism is so arranged that the first portion of the movement of the control lever in either direction produces a relatively slow movement of the piston in the cylinder, whereas a greater extent of movement of the control lever produces a relatively fast movement of the piston in the cylinder. It is desirable that the operator be able to sense the point in the travel of the control lever at which the speed of the piston changes from slow to fast, and therefore it is another object of the present invention to provide means for producing this result. In the accomplishment of this object, we have provided a yielding stop for a control lever, which permits free movement of the lever up to the maximum speed in the low speed range of the piston, but further movement of the lever into the high speed range in either direction of movement must first overcome the resistance of the yieldable stop, thereby informing the operator as to the range of operation in which he is controlling the piston.

These and other objects and advantages of our invention will be apparent to those skilled in the art after a consideration of the following description, in which reference is had to the drawings appended hereto, in which Figure 1 is a rear elevational view of a hydraulic control mechanism mounted on the rear end of a tractor, showing a portion of the rear axle housing of the tractor;

Figure 3 is an elevational view looking rearwardly into the opening in the front of the hydraulic control housing, as indicated by a line 3—3 in Figure 2, and drawn to a larger scale;

Figure 4 is a sectional view taken along a line 4—4 in Figure 3;

Figure 5 is a sectional view taken along a line 5—5 in Figure 3;

Figure 6 is a sectional elevational view taken along a line 6—6 in Figure 3;

Figure 7 is a sectional elevational view taken along a line 7—7 in Figure 3;

Figure 8 is an end view of the dual check valve, as viewed along a line 8—8 in Figure 6; and drawn to a still larger scale;

Figure 9 is a sectional view taken along a line 9—9 in Figure 6 and drawn to a larger scale;

Figure 10 is a sectional elevational view taken along a line 10—10 in Figure 3;

Figure 11 is a sectional plan view taken along a line 11—11 in Figure 1 and drawn to a larger scale;

Figure 12 is a sectional elevational view taken along a line 12—12 in Figure 11 and drawn to an enlarged scale;

Figure 13 shows a portion of the sectional plan view of Figure 11 which includes the connector for the remote cylinder, but showing the hose connector replaced by a plug to condition the mechanism for controlling the integral cylinder;

Figure 14 is a sectional bottom plan view taken along a line 14—14 in Figure 3;

Figure 15 is a top plan view showing the top of the hydraulic control housing with the top cover removed.

Figure 1:
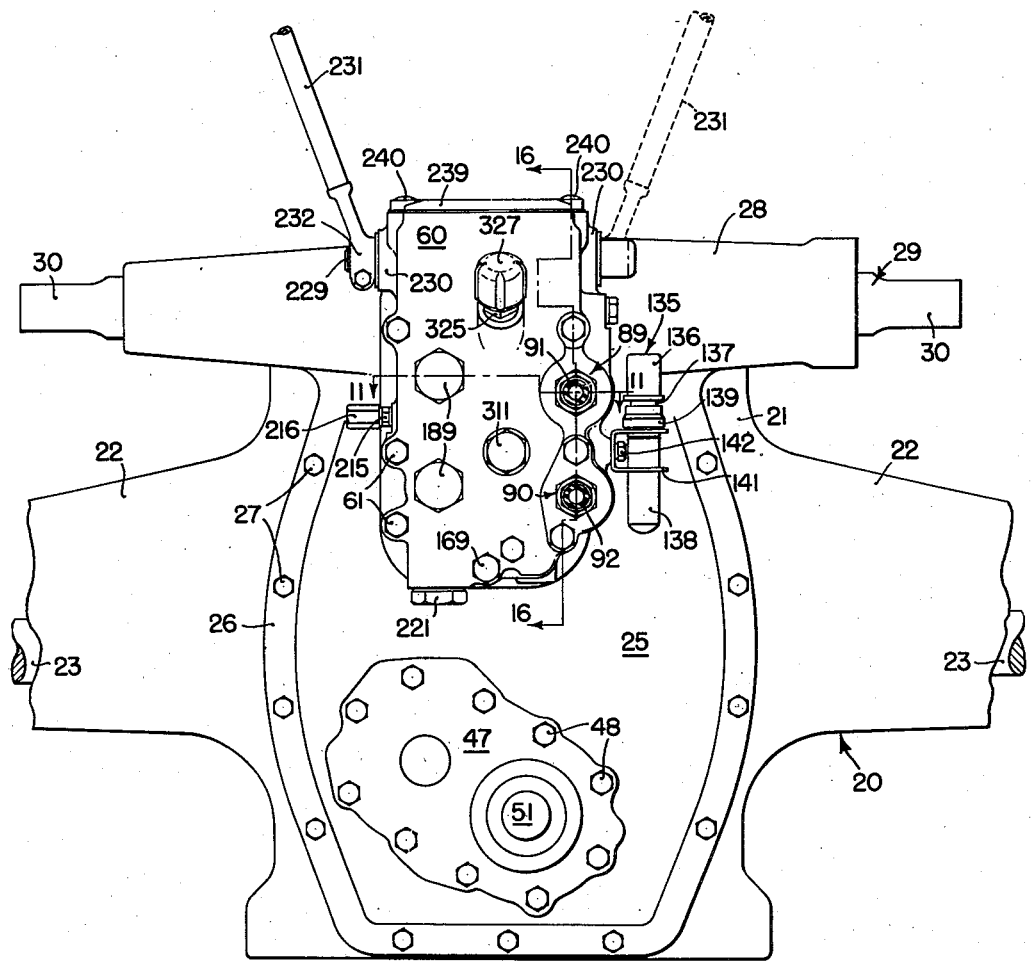
Figure 2:
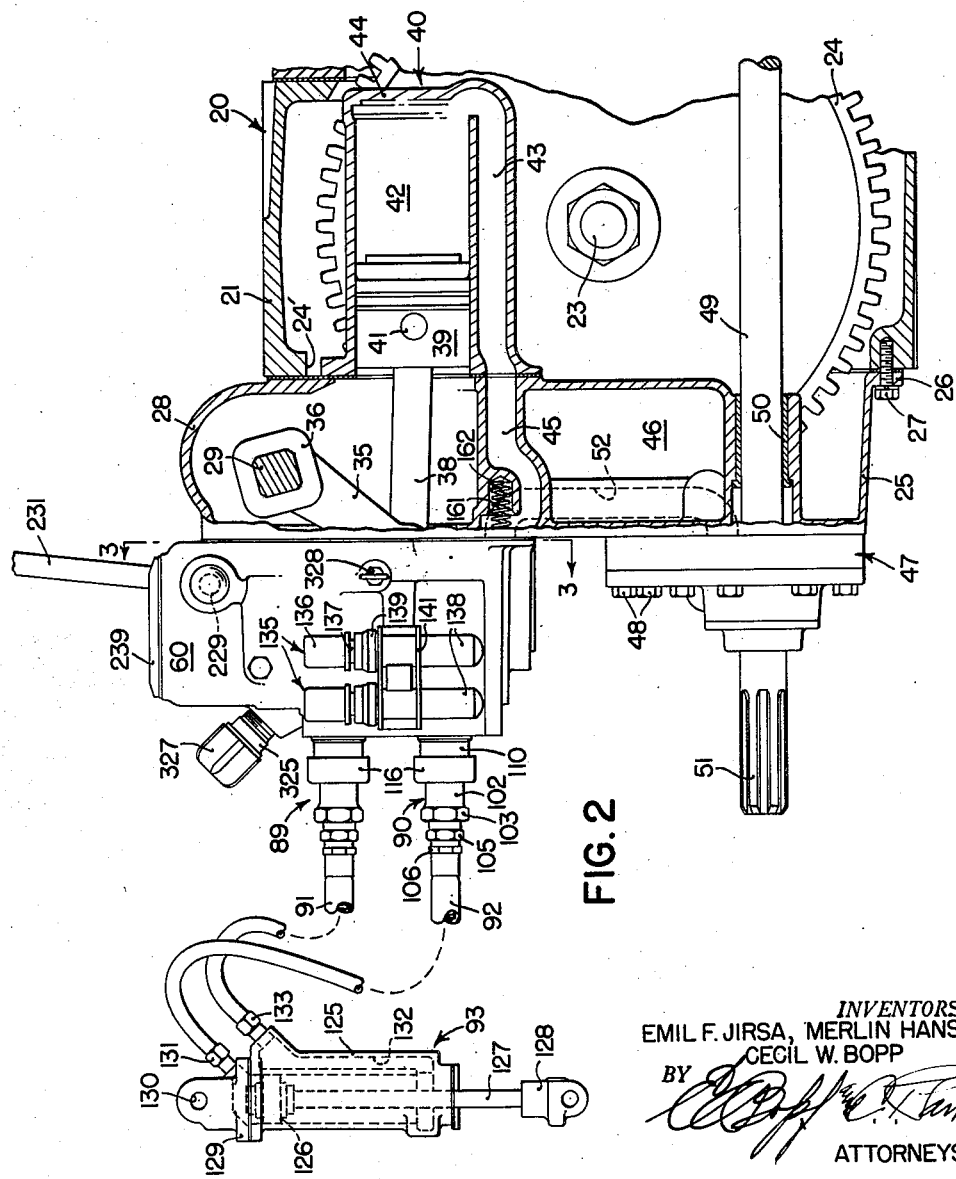
Figure 2 is a side elevational view of the hydraulic control mechanism showing a double acting remote cylinder connected to the mechanism and also showing the rockshaft housing and tractor axle housing cut away in section to expose the piston and cylinder and connections thereto.

Referring now to the drawings and more particularly to Figures 1 and 2, the tractor is indicated by a portion of its body including a banjo type rear axle housing 20 comprising an enlarged centrally disposed gear housing 21 and a pair of laterally extending axle housing quills 22 formed integrally therewith. The quills 22 contain a pair of coaxially disposed drive axles 23, the inner ends of which carry drive gears 24, disposed within the gear housing portion 21 and the drive gears 24 are driven from the engine of the tractor, the details of which are not shown since they are well known to those skilled in the art. The gear compartment 21 of the axle housing 20 is provided with a large opening 24' in the rear side thereof, which opening is covered by a large housing or cover 25 having an outwardly turned flange 26 extending peripherally around the housing 25 and secured to the gear compartment 21 by bolts 27. The housing 25 is integrally formed with a transversely disposed bearing sleeve 28 in the upper portion thereof, within which is journaled a conventional rockshaft 29, the two ends 30 of which extend laterally from the ends of the sleeve portion 28 and are of substantially square cross section for the purpose of receiving implement controlling and lifting arms (not shown), as is well known to those skilled in the art.

The rockshaft 29 is actuated by a rocker arm 35, fixed to a hub 36 secured to the rockshaft 29. The rocker arm 35 extends downwardly and is pivotally connected by a pin 37 to a piston rod 38 (see Figure 7). The piston rod 38 extends forwardly and is connected to the piston 39 of a fluid pressure motor 40 by means of a wrist pin 41. The fluid pressure motor 40 comprises the piston 39 and a cylinder 42, within which the piston is slidable. A fluid supply duct 43 is formed integrally with the cylinder 42 and extends axially along the lower side thereof for supplying fluid under pressure to the cylinder, the forward end of which is closed by an integrally formed cylinder head 44. The cylinder 42 is positioned between the two axle drive gears 24 and is secured to the front side of the housing 25, the latter having a duct 45 formed integrally therewith in register with the cylinder duct 43.

The construction so far described is identical with the hydraulic mechanism disclosed in Patent 2,302,637 granted November 17, 1942 to McCormick and Hansen, to which reference may be had for more complete description of this part of the apparatus. As in the patented structure, the housing 25 also includes an integrally formed reservoir 46 for the hydraulic fluid and also a conventional gear pump indicated generally by reference numeral 47, which is secured by bolts 48 to the rear side of the housing 25. One of the pump gears (not shown) is mounted on the tractor power takeoff shaft 49, which extends rearwardly from a suitable connection with the tractor engine and is journaled in a bearing 50 beneath the reservoir 46 and formed integrally with the housing 25. The power takeoff shaft 49 extends rearwardly through the pump 47 and has a splined rear end portion 51 for supplying power to implements associated with the tractor, in a manner well known to those skilled in the art. The pump 47 receives fluid from the reservoir 46 and discharges the same under pressure through a high pressure duct 52 extending upwardly through the reservoir 46, as disclosed in the above mentioned patent.

Coming now to that portion of the apparatus with which our invention is particularly concerned, a control housing 60 is secured to the rear side of the rockshaft housing 25 by means of a plurality of bolts 61, which extend through apertures 62 in the control housing 60 and engage suitable threaded apertures (not shown) in the housing 25. The control housing 60 is provided with an opening 63 in its forward side, which is disposed in register with a corresponding opening (not shown) in the rear side of the housing 25, thereby communicating with the reservoir 46 in the latter.

The control housing 60 is provided with a cored high pressure passage 64 provided with an intake port 65, best shown in Figures 3 and 6, disposed in register with the upper end of the pump discharge passage 52. The passage 64 extends upwardly from the port 65 and turns rearwardly, as indicated at 66, Figure 6, to an enlarged port 67 in a vertically disposed valve cylinder 68, within which is vertically slidable a valve plunger 69. The valve plunger 69 is provided with a centrally disposed piston or spool 70 disposed within the annular port 67 and substantially coextensive therewith. The laterally opposite sides of the valve plunger 69 and the upper edges of the piston 70 are ground off, as indicated at 71, to provide flat portions of the valve plunger 69, along which the hydraulic fluid can flow. Similarly, the laterally opposite sides of the valve plunger 69 below the piston 70, and the lower edge of the latter are ground off, as indicated at 72, to provide passages for the flow of hydraulic fluid. Hence, in the neutral or inactive position of the plunger 69, as shown in Figure 6, the fluid flowing upwardly through the passage 64 and into the port 67 divides between the upper and lower flat portions 71, 72 and flows therealong through the valve cylinder 68 to a pair of upper and lower annular ports 73, 74, which communicate through short passages 75, 76, respectively, with the interior of the control housing 60, which in turn is in communication with the reservoir 46, as explained above. The openings 75, 76 in the ports 73, 74 are best shown in Figure 3. Thus, when the control mechanism is inactive, the pump 47 furnishes a continuous flow of hydraulic fluid, such as oil, upwardly through the passages 64, 66, and along the flats 71, 72 to the ports 73, 74, from which it flows through the openings 75, 76 back to the reservoir.

A pair of annular ports 77, 78 are spaced axially above and below the central inlet port 67 in the valve cylinder 68 and these ports are connected to a pair of rearwardly extending passages 79, 80, respectively, the rear ends of the latter being turned upwardly and downwardly, respectively, and having valve seats 81, 82 communicating therewith. Check valves 83, 84 are seated in the valve seats 81, 82, respectively, and are of the poppet type and are of a special design, the details of which will be described later. The check valves 83, 84 open into a pair of cylinder supply ducts 85, 86, which are curved laterally and inwardly of the housing 60 and intersect a pair of cylindrical passages 87, 88, which extend rearwardly and outwardly of the housing 60, and are adapted to receive a pair of bayonet type connectors, indicated generally by reference numerals 89, 90, fixed to the ends of a pair of flexible hoses 91, 92 attached to a double acting fluid pressure motor 93. These connectors form the subject matter of our co-pending application, Serial No. 728,020, filed February 12, 1947, and will be only briefly described here.

Each of the bayonet type connectors 89, 90 comprises a tubular member 100, which is slidably insertable into the corresponding cylindrical passage 87 or 88 and is provided with an axially extending opening 101 therethrough. The outer end of the tubular connector 100 is provided with an enlarged cylindrical head portion 102, the outer end of which has a hexagonal portion 103 adapted to receive a wrench for use in assembling and disassembling the connector. The outer end of the aperture 101 through the connector 100 is enlarged, as indicated at 104 (see Figure 11), the enlarged portion 104 being threaded to receive a bushing 105, within which is threaded a hose fitting 106, within which the associated hose 91 or 92 is suitably fixed by means not forming a part of the present invention.

Each of the connectors 89, 90 is adapted to be inserted into a bayonet-receiving sleeve member 110, which is threaded to engage the enlarged outer end portion 111 of the passage 87, the portion 111 being also threaded to secure the member 110 therein. An annular recess 112 is provided in the inner end of the sleeve 110 to receive an annular sealing member 113, which is held in compression by means of a coil spring 114 in engagement with the outer surface of the tubular member 100, thereby preventing leakage of oil outwardly of the housing 60 along the surface of the tubular member 100. The outer end of the sleeve 110 has an enlarged bore, indicated at 115, which receives the head portion 102, and the outer surface of the outer end of the sleeve 110 is threaded to receive a collar 116, the latter being internally threaded at 117 to engage the threads on the sleeve 110. The collar 116 is provided with an inwardly extending radial flange 118, which slidably embraces the head 102 of the connector 100. The head 102 is provided with a peripherally extending groove 119, normally disposed substantially in radial alignment with the outer end of the sleeve 110 and adapted to receive a segmental washer 120, see Figures 11, 12, and 13. The washer 120 is substantially U-shaped, with inwardly extending tangs 121 and is adapted to be slipped into the slot between the end of the sleeve 110 and the inner surface of the flange 118 of the collar 116, so that when the latter is screwed tightly on the threaded sleeve 110 the washer 120 prevents the bayonet connector 100 from sliding rearwardly out of the sleeve 110.

The connector 100 can easily be removed from the passage 87 and sleeve 110 by unscrewing the collar 116, after which the connector 100 and its associated hose can be slipped rearwardly out of the sleeve.

The double acting fluid pressure motor 93 is adapted to be mounted on the tongue or draft member of a trailing implement and comprises a cylinder member 125, within which is slidably disposed a piston 126 connected to a piston rod 127 having a connecting knuckle 128 mounted on the outer end thereof and adapted to be coupled to the control element or lifting lever of the trailing implement (not shown). The cylinder 125 is provided with a cylinder head 129, which has an aperture 130 therein to receive a mounting pin for mounting the cylinder on the tongue. The head 129 is provided with a hose fitting 131, to which the upper flexible hose 91 is connected, while the cylinder casting 125 is provided with a cored passage 132 leading to the opposite end of the cylinder and provided with a fitting 133 to which the lower hose 92 is connected.

Certain implements, such as plows, are frequently equipped with releasable draft connections, to permit the plow to become detached from the tractor when the plow encounters an immovable obstruction such as a large stone or stump. In this event, it is especially desirable to have a releasable connection in each of the flexible hoses to prevent the latter from being subjected to the full drawbar pull of the tractor. To accomplish this result, the segmental washer 120 is made of a relatively easily shearable substance, such as porous bronze, aluminum or soft copper, so that in case of failure of the implement draft connection, the tension in the hoses 91, 92 will shear the tangs 121 of the washers between the inner edges of the grooves 119 and the inner edges of the flanges 118 on the collars 116. After the implement has been reconnected to the tractor, the hose connectors 100 can be reinserted into the sleeves 110 and secured by means of a new pair of segmental washers 120, although care must be taken to clean any dirt from the connectors 100 before reinserting them into the passages 87, 88.

When it is desired to remove the remote cylinder 93 and operate the integrally mounted fluid pressure motor 40, the connectors 100 are withdrawn from the passages 87, 88 after their securing collars 116 have been unscrewed, and the connectors 100 are then replaced with solid plugs 135, each of which is provided with a head portion 136 of larger diameter, which is slidably received within the enlarged opening 115 in the outer end of the sleeve 110. The head 136 of the plug 135 serves as a handle by means of which the plug can be inserted and withdrawn relative to the sleeve 110. The plug is secured in the sleeve 110 by means of the collar 116, the flange 118 of which engages a radial flange 134 on the plug head 136. The shear washer 120 can be inserted in a groove 137 extending peripherally around the head 136 provided merely for carrying the washer, as the latter is not needed when the cylinder 93 is not being used. Thus, the plug 135 extends through the seal 113, thereby preventing any leakage of oil out of the cylindrical passage 87. The plug 135 is substantially the same length as the connector 100 but is provided with a bore 145 in the end thereof extending axially and communicating with a diametrically extending opening 146 in a section of the plug of reduced diameter, the purpose of which will be explained later. Hence, it will be evident that the plugs 135 are interchangeable with the tubular connectors 100.

When the remote cylinder 93 is connected for operation, the plugs 135 are stored in scabbards 138 (see Figures 1 and 2). Each of the scabbards 138 comprises a tubular member having a closed end and an internally threaded collar 139 adapted to cooperate with a threaded flange 140 (see Figure 13) on the inner end of the head 136 of the plug. Each of the scabbards 138 is adapted to be inserted through a pair of vertically aligned apertures in a sheet metal bracket 141 of U-shaped cross section, which is secured by screws 142 to the side of the control housing 60, The same scabbards 138 can be used to protect the tubular connectors 100 when the remote cylinder 93 is not in use, at which time the plugs 135 are disposed within the sleeves 110. Each of the scabbards 138 is long enough to receive the tubular connector 100, the latter having a threaded flange 143 adapted to screw into the internally threaded collar 139 around the open end of the scabbard. It has been found that with a little practice, an operator can readily withdraw the tubular connector 100 from the sleeve 110, slide in the plug 135, and secure the latter, and slip the scabbard 138 over the tubular connector and secure the same with no appreciable loss of oil. With the scabbards 138 protecting the tubular connectors 100, it is evident that the oil remaining within the cylinder and flexible hoses will not be lost, while the scabbards also prevent dirt, water, or air from getting into the hoses.

The rear end of the passage 45 in the housing 25, for conveying hydraulic fluid to and from the integral cylinder 42, is disposed in register with a port 150 in the front side of the control housing 60, best shown in Figure 14. The port 150 communicates with a passage 151, the rear end of which turns upwardly and outwardly, as indicated at 152 (Figures 3 and 7). The passage 152 communicates with an annular port 153 in the cylindrical passage 88 which receives the lower hose connector 90. The annular port 153 is disposed intermediate the ends of the cylindrical passage 88, so that when the tubular member 100 of the hose connector 90 is inserted within the passage 88, the outer surface of the connector 100 blocks the port 153 and passages 151, 152, thereby locking the integral cylinder 42 against movement. An annular sealing device 154 (see Figures 14 and 16), prevents any flow of fluid between the port 153 and the supply passage 86. However, it will be evident that when the tubular member 100 is replaced by the plug 135, there is a connection between the port 153 and the supply passage 86 through the bore 145 and opening 146 in the plug 135. The inner end portion of the plug holds the inner seal 154 in place.

Figure 16:
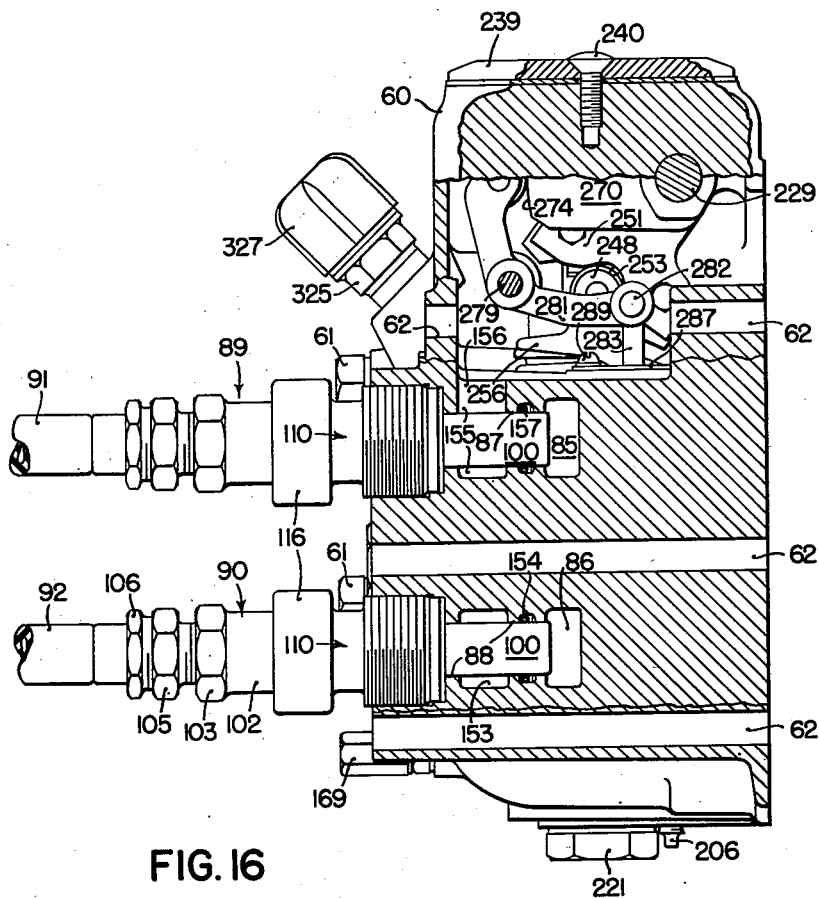
Figure 16 is a sectional elevational view taken along a line 16—16 in Figure 1.

A similar annular port 155 is disposed in the intermediate portion of the upper cylindrical passage 87, and this port communicates with the interior of the housing 60 through an opening 156 in the top of the port 155, best shown in Figure 16. As indicated in Figures 11 and 16, when the tubular member 100 of the upper hose connector 89 is disposed in operating position in the cylindrical passage 87, the port 155 is blocked and the fluid flows from the supply passage 85 through the connector 100 to the hose 91. An annular sealing device 157 prevents any leakage of oil along the outer surface of the tubular connector 100 and through the exhaust port 156. When the plug 135 is substituted for the hose connector 89, it is evident from Figure 13 that the supply passage 85 is connected directly with the port 155 and exhaust opening 156 through the bore 145 and opening 146 in the plug.

Referring now more particularly to Figures 2 and 14, a check valve 160 of the poppet type is seated in the port 150 and is urged toward seated position by means of a light compression spring 161, which is supported in a socket 162 in the housing 25. When the hydraulic fluid is forced into the cylinder 42 through the port 153, and passages 152, 151, 45 and 43, the force of the oil opens the valve 160 to permit a substantially free flow therethrough. However, when the piston 39 returns toward the forward end of the cylinder 42, forcing the oil back through the passages to the reservoir, the valve 160 is returned by the spring 161 and by the force of the oil to a partially closed position as determined by a stop pin 163 disposed at the inner end of the stem 164 of the valve 160. The pin 163 is disposed within an aperture 165, which is threaded to receive a threaded portion 166 on the pin 163 for purposes of adjusting the latter axially relative to the valve stem 164. A lock nut 167 engages the threaded portion 166 of the pin for the purpose of locking the latter in adjusted position to determine the amount of opening around the valve 160, thereby determining the speed with which the rockshaft returns from the raised position shown in Figure 2 to the lowered position under force of gravity exerted upon the load carried on the rockshaft 29. The outer end of the pin 163 is slotted, as indicated at 168, to receive a screwdriver for purposes of adjustment and a cap 169 is provided for protecting the end of the pin in adjusted position and sealing against oil leakage along threads 166. The cap 169 is internally threaded to receive the threaded portion of the pin, which extends to the outer end of the latter. Details of this valve 160 and its operation are contained in the McCormick and Hansen patent referred to above, and do not form a part of the present invention.

Referring now more particularly to Figures 6, 8 and 9, each of the check valves 83, 84 is a dual valve comprising an outer poppet valve 175, the stem of which is hollow and receives an inner poppet valve 176 therein. The stem of the inner valve 176 fits closely but slidably within the passage 177 in the stem of the outer valve 175 and the inner valve seats in the outer end of the passage 177 in the head of the outer valve. The stem of the outer valve 175 is provided with three apertures 178, 179, 180, spaced peripherally and extending radially in communication with the passage 177. The stem of the inner valve 176 is provided with an annular groove 181 under the head of the valve and is also relieved along one side of the stem, as by grinding a flat portion 182 axially along the stem of the inner valve from the groove 181 to establish communication with any one of the three apertures 178, 179, 180, selectively. The inner valve 176 can be rotated about the common axis of the two valves to place the flat portion 182 in register with any of the apertures 178, 179, 180, the latter being of relatively different diameters so that the resistance to the flow of oil through the inner valve can thus be adjusted. The two valves 175, 176 are secured in angularly adjusted position by means of a locking washer 182', the latter having a non-circular aperture 183 therein which fits over a correspondingly shaped head 184 on the valve head. The locking washer 182' has a radially extending ear 185 which can be inserted into any of three notches 186 in an axially extending flange 187 encircling the head of the outer valve 175, the three notches 186 corresponding to the positions of registry of the three apertures 178, 179, 180, respectively. Each of the check valves 83, 84 is urged toward closed position by means of a compression spring 188, which bears against the washer 182' and reacts against a plug 189 screwed into a threaded opening 190 in the outer end of the supply passage 86. A similar plug 189 is provided for the other check valves 83 and screws into a similar threaded opening 190 in the outer end of the passage 85. These valves form the subject matter of our co-pending application, Serial No. 35,214, filed June 25, 1948.

Each of the check valves 83, 84 is actuated by means of a ball 195 disposed at the inner end of the valve stems, and the balls 195 bear against inclined grooves 196 in the valve plunger 69. The grooves 196 are so inclined that when the valve plunger 69 is moved upwardly, the upper ball 195 is cammed outwardly against the upper check valve 83, while if the valve plunger 69 is moved downwardly within the valve cylinder 68 the lower ball 195 is forced outwardly to actuate the lower check valve 84. The length of the stems of the two coaxial valves is such that the balls 195 engage the inner stems and open the inner valves 176 before they engage the ends of the hollow stems of the outer valves 175. This reduces appreciably the amount of effort necessary to open one of the check valves, for if a single valve were to be used in place of one of the dual valves, the oil pressure against the large head would make it very difficult to raise the valve off its seat, but the area of the small inner valves is so much less than the area of a single check valve that the total pressure is greatly reduced. After the inner valve has been cracked open, the pressure on the head of the outer valve is reduced sufficiently to make it comparatively easy to open. The balls are thus used as tappets for opening the inner and outer check valves, sequentially, and eliminate a considerable amount of the friction and side thrust on the valve stems that would be involved if the inclined camming surfaces on the valve plunger directly contacted the valve stems.

The valve plunger 69 is provided with a pair of spools or pistons 197, 198 at its upper and lower ends thereof, respectively, the inner edges of which are spaced outwardly from the inner edges of the annular ports 73, 74, thus providing for a free flow of oil along the valve cylinder 68 into the exhaust ports 73, 74, when the plunger is in its neutral position. Moving the valve plunger 69 downwardly, however, moves the upper piston 197 into the upper end of the valve cylinder 68, thereby closing off the upper reservoir port 73. Similarly, when the plunger 69 is moved upwardly, the valve piston 198 acts against the upper edge of the port 74 to close the latter against flow of oil downwardly into the reservoir.

The operation of the mechanism thus far described will now be explained. To operate the rockshaft 29, it is first necessary to disconnect the remote cylinder 93 by unscrewing the threaded collars 116 and withdrawing the connectors 89, 90 out of the passages 87, 88, after which the plugs 135 are inserted into the sleeves 110 and secured by means of the shear washers 120 and collars 116. The rockshaft 29 is actuated in a clockwise direction, as viewed in Figure 2, to raise the implement associated therewith, this being accomplished by moving the valve plunger 69 upwardly in the valve cylinder 68. The upward movement of the plunger 69 brings the lower piston portion 198 into closing relation with the edge of the exhaust port 74 and simultaneously moves the central piston portion 70 upwardly to cut off the flow of oil upwardly through the valve cylinder 68. This flow is not reduced abruptly, however, in view of the fact that the edge of the piston portion 70 is ground off on an arc 201, with the result that the upward flow of oil through the cylinder 68 is not entirely cut off until the lowest point on the curved edge 201 coincides with the upper edge of the central port 67. During this gradual cutoff of the oil flow to the reservoir, the pressure increases in the high pressure duct 64 and in the lower portion of the valve cylinder 68 beneath the inlet port 67. This causes the oil to flow along the flat portion 72 of the valve plunger 69 and through the port 78 and passage 80, thereby forcing the check valve 84 away from its seat 82 against the pressure of the spring 188. The oil then flows through the supply duct 86 and through the passage 88, but inasmuch as the latter is blocked by the plug 135, the oil flows into the port 153 and along the passages 152, 151, through the port 150. The oil pressure forces the valve 160 open against the pressure of the light spring 161 and then enters the forward end of the cylinder 42 through the ducts 45, 43, causing the piston 39 to move rearwardly in the cylinder. The upward movement of the valve plunger 69 has also forced the inclined surface of the groove 196 against the ball 195 to open the upper check valve 83, but there is no flow of oil through this valve at this time, after the edge 201 moves into register with the upper edge of the port 67.

The movement of the piston 39 in the cylinder 42 can be interrupted at any point within its range by merely returning the valve plunger 69 to the neutral position shown in Figure 6, whereupon the oil supplied by the pump is again exhausted to the reservoir through the upper and lower exahust ports 73, 74. The check valve thus closes, thereby locking the oil within the cylinder 42 and the passages connected therewith.

The piston 39 can be returned toward the closed end of the cylinder 42 by moving the valve plunger 69 downwardly in the valve cylinder 68 from the neutral position. Assuming that there is an implement load on the rockshaft 29, tending to rotate the latter in a counter clockwise direction, as viewed in Figure 2, it will be evident that there is an appreciable pressure built up by the piston 39 against the oil which is locked within the cylinder 42 by the lower check valve 84. Thus, it will be evident that by opening the check valve 84, the oil trapped in the cylinder 42 will be forced outwardly through the valve seat 82, thereby permitting the piston to move toward the closed end of the cylinder and allowing the rockshaft to move in a counter clockwise direction to lower the implement. Accordingly, the first movement of the plunger 69 downwardly in the valve cylinder 68 cams the valve actuating ball 195 against the end of the valve stem of the inner poppet valve 176, permitting the oil to flow from the supply passage 86 under the head of the inner valve 176 and along the release passage 182, and out through the aperture 179 and through the passage 80 to the port 78, then downwardly through the valve cylinder 68 to the reservoir port 74. As the plunger 69 moves downwardly in the cylinder 68, the oil from the pump flows upwardly into the upper portion of the valve cylinder 68, but inasmuch as the upper spool or piston 197 closes the reservoir port 73, the oil leaves the valve cylinder 68 through the port 77, passage 79, and valve seat 81, into the upper supply passage 85, and then through the passage 87 into the intermediate port 155, and since the plug 135 closes the outer end of the passage 87, the oil flows upwardly through the exhaust port 156 and returns to the reservoir.

It will be noted that the speed of travel of the piston 39 forwardly in the cylinder 42 is dependent first on the amount of opening under the valve 160 as determined by the adjustable pin 163, and second, by the size of the aperture 179 in the hollow stem of the outer check valve 175, which restricts the flow of oil under the head of the inner valve 176. However, by moving the valve plunger 69 downwardly to its extreme position, the ball 195 engages the end of the hollow stem of the outer valve 175 and opens the latter, thereby allowing the oil to flow through the seat 82 as well as through the inner seat, thereby causing the piston to move at a greater rate in the cylinder 42. It is also evident that the speed of travel of the piston can also be controlled by infinitesimal increments by shifting the valve plunger 69 in the valve cylinder 68, thereby adjusting the amount of opening under the heads of the inner and outer check valves 176, 175.

Provision is also made for adjusting the speed of travel of the piston 39 rearwardly in the cylinder 42 to adjust the speed of raising movement of the rockshaft 29 in a clockwise direction, as viewed in Figure 2. Referring more particularly to Figures 3 to 6, inclusive, it will be noted that a drilled passage 205 extends upwardly from the bottom of the control housing 60, the lower end of this passage being closed by a plug 206. This passage intersects the horizontal portion 66 of the high pressure duct 64 and continues upwardly to intersect a horizontal passage 207, which extends inwardly from the side of the control housing 60. The passage 207 intersects a second horizontal passage 208, which extends rearwardly from the front side of the housing 60, the opening of the passage 208 being closed by a plug 209. The passage 208 communicates with a port 210 in the valve cylinder 68 above the inlet port 67. The valve plunger 69 is reduced in diameter in front of the port 210 as indicated at d to provide for flow of oil from the latter to the flat 71 and thus to the reservoir port 73. The passage 207 is provided with an annular valve seat 211, which cooperates with a valve member 212 in the form of a pin having a threaded portion 213 which engages internal threads in the passage 207. The outer end of the pin is provided with a slot 214 adapted to receive a screwdriver for adjusting the valve 212 toward and away from the seat 211, for increasing or decreasing the resistance to the flow of oil which is by-passed from the inlet passage 66 to the valve cylinder 68. The purpose of this by-pass or bleeder duct 205, 207, 208, 210 is to by-pass a portion of the oil supplied through the duct 64 after the valve plunger 69 has been raised to the point in which the cutoff edge 201 has closed the upper edge of the inlet port 67, thereby reducing the speed of travel of the piston 39 rearwardly in the cylinder 42 during the raising operation. This bleeder port 210, however, is gradually cut off by the piston portion 70 of the valve plunger as the latter is raised in the cylinder 68, until in extreme upper position, the bleeder port 210 is entirely closed, thereby providing for maximum speed of movement of the piston 39. Thus, the speed of raising movement of the piston can be adjusted by adjusting the valve 212 toward or away from the seat 211, and a lock nut 215 is provided for securing the valve 212 in adjusted position. A cap 216 is provided for protecting the outer end of the valve pin 213. This valve 212 should preferably be closed when the control mechanism is used in connection with a remote cylinder 93 of the double acting type, as will be seen later.

The valve mechanism can be used to control a remote cylinder of the single acting type in which the fluid is supplied to only one end of the piston, relying upon the force of gravity or other means for returning the piston to the closed end of the cylinder, without any preparation other than to remove the lower plug 135 from the lower cylindrical passage 88 and replace it with a hose connector 99 connected to the single flexible hose 92 leading to the single acting remote cylinder (not shown). The operation with this type of remote cylinder is similar to that described in connection with the single acting integral cylinder 42, except that the oil is forced from the supply passage 86 through the tubular connector 109 and through the flexible hose 92 to the remote cylinder, while the port 153 leading to the integral cylinder 42 is blocked by the tubular member 109, as indicated in Figure 16. The upper plug 135 is left in place, thereby exhausting the upper supply passage 85 through the port 156 to the reservoir as before.

The operation of the mechanism in connection with a double acting remote cylinder 93 will now be described. As in the case of the integral cylinder 40, the double acting remote cylinder 93 is extended in a power stroke by moving the valve plunger 69 upwardly in the valve cylinder 68. This directs the flow of oil from the pump passage 64 downwardly through the cylinder 68 and through the lower check valve 84, the lower hose connector 90, and the flexible hose 92 to the head end of the remote cylinder 93, thereby causing the piston 126 and piston rod 127 to move outwardly in the cylinder casting 125. The oil on the outer side of the piston 126 is forced by the latter through the duct 132 and fitting 133 to the flexible hose 91, which leads the oil through the upper hose connector 89 and tubular member 109 to the upper supply passage 85. In the raised position of the plunger 69 the inclined camming groove 196 forces the ball 195 outwardly, thereby opening the inner valve 176 to permit the oil to flow through the seat and along the relieved portion 182 to one of the apertures 178, 179, 180 in the check valve 83. Upon further upward movement of the valve plunger 69, the ball 195 engages the tubular stem of the valve 83 and lifts the valve head from the seat 81, thereby obtaining a freer flow of oil therethrough, from which the oil flows through the passage 79 and along the flat portions 71 of the plunger into the reservoir port 73.

As stated above, it is preferable to close the bleeder valve 212 against its seat 211 when the double acting remote cylinder is used, for the resistance of the small apertures 178, 179 or 180 results in a reduced speed of operation of the piston 126 in the cylinder 125 unless the plunger 69 is moved upwardly to its extreme position. However, inasmuch as no more oil can flow into one end of the cylinder 125 than flows out the other end, there will be a surplus of oil supplied by the pump when the double acting hydraulic motor 93 is operated at that reduced speed. This oil surplus is exhausted to the reservoir through an excess pressure relief valve which will be described later.

The piston 126 is returned by hydraulic power to the head end of the cylinder 125 by shifting the valve plunger 69 downwardly from its neutral position until the curved edge 202 of the relieved portion 72 on the valve plunger 69 moves into blocking position at the lower edge of the port 67, thereby preventing the oil from flowing downwardly through the valve cylinder 68, whereupon all of the oil from the duct 64 flows upwardly through the cylinder 68 and along the flat sides 71 of the plunger. The spool 197 at the upper end of the plunger has now moved into closing relation in the top of the cylinder 68, closing off the reservoir port 73, and directing the oil through the port 77, passage 79, and seat 81, to force open the upper check valve 83. The oil then flows through the upper supply passage 85, through the connector 89 and flexible hose 91 to the cylinder passage 132, from which it flows into the outer end of the cylinder 125 and forces the piston 126 toward the head of the cylinder. The speed of piston movement in this direction is governed, during the first portion of downward movement of the plunger 69, by the size of the aperture 178, 179 or 180, which is disposed in register with the relieved portion 182 on the inner stem of the lower check valve 84. Here again, the surplus oil supplied through the duct 64 by the pump must be relieved through an excess pressure relief valve as will be described later.

The lower end of the valve cylinder 68 is threaded, as indicated at 220, to receive a plug 221 in the bottom of the housing 60. The plunger 69 can be removed from the cylinder 68 downwardly through the threaded aperture 220 after the plug 221 has been removed. The upper end of the plunger 69 is provided with an upstanding ear 225 (see Figures 3 and 6), which is connected by a short link 226 to an arm 227 cast integrally with a hub 228 rigidly fixed on a control rockshaft 229, which is journaled in a pair of bearing bosses 230, which are integral with the sides of the control housing 60. A control lever 231 is mounted on a hub 232, which can be mounted on either end of the rockshaft 229, the latter extending laterally out of the housing 60 for this purpose. A key 233 is provided between the rockshaft 229 and the hub 232 for preventing relative rotation therebetween. In Figure 1 the lever 231 is shown in solid lines in mounted position on the left end of the shaft 229 and in dotted lines is shown the alternative position of the lever on the other end of the shaft.

Thus it is evident that with the lever 231 extending upwardly in a substantially vertical position, although inclined slightly in a transverse direction, the valve plunger 69 is in its intermediate or neutral position shown in Figure 6. The valve plunger 69 is raised by swinging the lever 231 forwardly, thereby rocking the rockshaft 229 in a counterclockwise direction, as viewed in Figure 6. Conversely, by swinging the lever 231 rearwardly from the neutral position, the valve plunger 69 is lowered from its neutral position. The limit of downward movement of the valve plunger is determined by the engagement of the lower end of the plunger with the plug 221. The upper limit of movement of the plunger 69 is limited by means of an adjustable limit stop comprising a bolt 235 extending through a suitably threaded aperture in an arm 236, formed integrally with the hub 228 and plunger actuating arm 227. The threaded end of the bolt 235 engages a shoulder 237 in the top of the housing 60, which defines the edge of a top opening in the latter, and the bolt 235 is so adjusted that when it engages the shoulder 237 the piston portion 70 of the plunger 69 covers the port 210 in the bleeder duct 208.

A lock nut 238 is provided on the bolt 235 for locking the latter in adjusted position.

A cover plate 239 closes the opening defined by the shoulder 237 in the top of the housing 60 and is secured in place by a pair of screws 240.

The valve plunger 69 is yieldably retained in neutral position by means of a centering arm 245, which is swingably mounted on a transverse shaft 246, the latter being carried between two bearing supports 247 in the housing 60 (see Figures 10 and 11). The arm 245 carries a roller 248 journaled on a pin 249 between a pair of legs 250 formed integrally with the arm 245. The roller 248 bears on the edge of a cam 251, which is formed integrally with a hub 252 rigidly clamped to the control rockshaft 229 to rock therewith. The outer edge of the cam 251 is provided with a depression 253, which receives the roller 248 when the rockshaft 229 is positioned to set the valve plunger 69 in its neutral position. The roller 248 is urged into the depression 253 by means of a helical compression spring 255, which bears against an arm 256 extending outwardly of the roller supporting legs 250 on the arm 245. The other end of the spring 255 is received within a recess 257 in the housing casting 60. The sides of the recess 253 are inclined in outwardly converging manner, so that the pressure of the roller 248 against the sides of the recess 253 tends to center the rockshaft 229, the control lever 231, and the valve plunger 69 by action of the spring 255.

It is desirable that the operator be able to feel that point in the movement of the control lever 231 when the valve plunger 69 is in its low speed operating position, with the inner check valve member 176 open but with the outer check valve member 175 closed, and with the cutoff edge 201 or 202 of the piston member 70 in register with the corresponding edge of the inlet port 67. This is provided for in each direction of movement of the control lever 231 by means of a pair of camming plates 260, 261, which are slidably disposed in slots 262 in the camming edge of the cam 251 on either side of the recess 253 (see Figures 3, 10 and 15). Each of the camming plates 260, 261 is secured within the slot 262 by means of a bolt 263, which passes through an elongated slot 264 in the plate to permit each of the plates to be adjusted toward and away from the central recess 253 in the cam. Each of the camming plates 260, 261 is provided with a beveled edge 265, which is adapted to engage the roller 248 when the rockshaft 229 is rocked to raise or lower the valve plunger 69 from its neutral position to the low speed operating position mentioned above. Thus, when the operator feels the resistance of the lever to further movement in either direction, he knows that the roller 248 has engaged the camming shoulder 265 and therefore the fluid motor is moving at its maximum speed in the lower range of operation. However, by moving the control lever 31 still further, the shoulder 265 acts to depress the roller 248 and arm 245 against the compression of the spring 255. This requires a little more effort exerted against the control lever 231, telling the operator that the valve plunger 69 is in the higher speed range of operation of the fluid motor, and has raised the outer check valve member 175 from its seat. At any time, the operator can let go of the lever 231, and the force of the compression spring 255 acting through the roller 248 will swing the rockshaft 229 and lever 231 back to its neutral position.

When the operator is making an adjustment of the implement by means of the hydraulic mechanism, it is of course necessary for the operator to manipulate the control lever 231 as described above. However, when the operator desires a full stroke operation of the fluid motor piston in its cylinder, such as when raising an implement to the transport position or dropping it to an extreme lowered position, it is desirable that the lever may be simply swung to its extreme position in either direction, selectively, and released by the operator without the necessity for holding it in operating position until the fluid motor has completed its stroke. For example, when operating a cultivator or plow, the operator must raise the implement and immediately turn the tractor when he comes to the end of the row or furrow, and it would be inconvenient for him to hold the operating lever in its raised position until the implement is fully raised. Therefore, a detent mechanism is provided for retaining the lever in either extreme position and for automatically releasing the lever and returning it to neutral position as soon as the fluid motor has reached the end of its stroke.

Referring now more particularly to Figures 3, 7 and 15, a rearwardly extending latching plate 270 is formed integrally with the hub 252, the latter being split axially, as indicated at 271, and provided with a pair of clamping lugs 272 clamped together by a bolt 273 to secure the hub 252 rigidly on the rockshaft 229. The plate 270 is provided with an arcuate edge 274, which is curved about the axis of the control rockshaft 229 in a circular arc. The surface 274 is engaged by a roller 275, which is journaled on a pin 276 in one arm 277 of a bell crank, having a hub 278 mounted on a shaft 279, the latter being disposed transversely in the housing 60 and supported in one wall thereof and in a lug 280. The other arm 281 of the bell crank is pivotally connected by a pin 282 to a rod 283, which extends vertically downwardly through a cylindrical passage 284 in the housing casting 60. The lower end of the bolt 283 is riveted to a washer 285 against which bears the lower end of a compression spring 286. The upper end of the spring 286 reacts against a plate 287 which has a central aperture 288 through which the vertical rod 283 passes and the plate 287 is secured by screws 289 at the upper end of the cylindrical passage 284. The spring 286 is stressed in compression to urge the rod 283 downwardly, thereby swinging the bell crank arms 277, 281 in a clockwise direction, as viewed in Figure 7, and thereby urging the roller 275 against the curved surface 274. The roller 275 has no effect upon the rockshaft 229 during the intermediate portion of the stroke of the control lever 231 inasmuch as the surface 274 is an arc about the axis of the shaft 229. The edge of the camming plate 270, however, is beveled off sharply at the upper and lower corners, as indicated by reference numerals 291, 292. When the control lever 231 is swung to its extreme position in either direction, the roller 275 engages one of the beveled corners 291, 292 and latches the plate 270 in this position, holding the rockshaft 229 and control lever 231 against the action of the centering roller 248, thereby causing the fluid pressure motor to be extended to the end of its operating stroke. At the end of its stroke, the piston of the fluid pressure motor engages a stop which prevents any further extension. This causes the pressure of the fluid in the cylinder to rise to a value appreciably in excess of the pressure necessary to actuate the load, and this excess pressure is used to return the valve plunger 69 to its neutral position, as will be explained. When the piston 39 in the integral cylinder 42 reaches the end of its working stroke, as shown in Figure 2, the rear end of the piston rod 38 engages a boss 293 (Figures 3 and 7), formed integrally with the housing casting 60.

The excess pressure relief valve, mentioned above, is best shown in Figure 4, and comprises a sleeve type valve 300 having a hollow stem 301, which fits slidably within a passage 302 which communicates with the high pressure duct 64 through a drilled passage 303, which extends inwardly and upwardly from one side of the housing 60, the outer end of the passage being enclosed by a plug 304. A short duct 305 connects the drilled passage 303 with the pump discharge duct 64. The duct 305 is also drilled from the front of the housing through the duct 64, and the outer end of the passage is blocked by a plug 306. Thus, the oil can flow from the pump discharge duct 64 through the interconnecting passage 305 through the drilled passage 303 to the excess pressure relief valve port 302. Incidentally, the drilled passage 303 also intersects the vertical bleeder passage 205, which extends upwardly through the horizontal portion 66 of the pump discharge passage. The head of the valve member 300 is seated in the end of the short passage 302 and is disposed within an enlarged valve chamber 307. A strong compression spring 308 holds the valve 300 in closed position against all normal operating pressures. The spring 308 is disposed within a cylindrical passage 310, which extends inwardly from the rear of the chamber and is closed by a plug 311. The hollow stem 301 of the valve 300 is provided with radially extending apertures 312, which communicate with the valve chamber 307 when the valve 300 is forced by an excess pressure of oil against the spring 308. This relieves the oil from the pump discharge passage 64 through the passages 305, 303 and through the inside of the stem 301 and out through the radial apertures 312 into the valve chamber 307. The valve chamber 307 intersects the vertical cylindrical passage 284 underneath the washer 285 on the rod 283. A kickoff plunger 315 is slidably disposed in the lower portion of the cylindrical passage 284 and is provided with an intermediate portion of reduced diameter 316, around which the oil flows from the valve chamber 307. The lower end of the kickoff plunger 315 is provided with an axially upwardly extending recess 317, which is connected in communication with the passage 284 by apertures 318 in the reduced diameter portion 316. Thus, the oil from the cylindrical passage 284 flows through the apertures 318 into the recess 317 and acts upon the plunger 315 to force the latter upwardly into engagement with the washer 285 and pushes the latter and the rod 283 upwardly, thereby swinging the bell crank arms 277, 281 in a counterclockwise direction, as viewed in Figure 7, about the supporting shaft 279, thereby lifting the roller 275 out of engagement with the beveled corner 291 or 292. The passage 284 is provided with an annular groove 320, which is connected in communication with the reservoir through a port 321. Thus, when the edge 323 on the plunger 315 along the upper end of the portion 316 of reduced diameter moves upwardly beyond the lower edge of the annular groove 320, the oil within the passage 284 is exhausted through the groove 320 and aperture 321 to the reservoir.

A small hole 322 is provided in the housing casting below the aperture 321 to relieve the pressure in the cylindrical passage 284 to permit the oil in the passage to escape after the valve plunger 69 has been returned to its neutral position. As soon as the roller 275 is lifted out of engagement with the beveled corner 291 or 292, the pressure of the spring 255 acting against the roller 248, forces the latter against the inclined edges of the recess 253, thereby returning the rockshaft 229 and control lever 231 to neutral position from either extreme position of operation.

Hydraulic fluid is supplied to the reservoir 46 through a fitting 325, which is screwed into a threaded aperture 326 in the rear side of the housing 60, best shown in Figure 10. The fitting 325 is provided with a cap 327 which normally closes the fitting 325. A petcock 328 is provided in the side of the housing 60 at the preferred level of the liquid in the housing. When the operator is replenishing the liquid in the reservoir 46, he opens the petcock 328 and fills the reservoir until the fluid flows out of the petcock 328, after which the latter is closed tightly and the mechanism is ready for operation.

The operation of the power control mechanism will now be briefly summarized. When the operator wishes to extend the fluid pressure motor, thereby raising the implement, he moves the operating lever 231 forwardly, and if he wishes to lower the implement he moves the lever 231 rearwardly from its vertical neutral position. When it is desired to make a minor adjustment in the position of the implement, the lever 231 may be moved only a small distance to cause the piston of the motor to move slowly in the desired direction, and the farther the lever is moved the faster will be the movement of the piston in its cylinder. When the operator feels the resistance to the actuation of the control lever 231 provided by the roller 248 engaging the camming plate 260 or 261, he knows that the piston is moving at its maximum speed in the low speed range of operation, as determined by the setting of the bleeder valve 212 in the case of a single acting cylinder or by the size of the aperture 178, 179 or 180 in the dual check valve when operating a double acting remote cylinder. The speed of lowering the implement in the case of the single acting integral cylinder is also controlled by the setting of the check valve 160 by means of the adjusting pin 163. The high speed range of adjustment of the fluid pressure motor is obtained by moving the lever 231 against the action of the roller 248 climbing over the inclined shoulders 265 of the camming plates 260, 261, and the farther the lever 231 is moved, the greater the opening under the outer check valve 175, and hence the greater the speed of operation of the fluid pressure motor.

The movement of the motor can be stopped at any time by the operator releasing the control lever 231, which will be centered by the action of the spring 255 acting through the roller 248 and recess 253 in the yoke 251, but when the lever 231 is swung to its extreme position in either direction, it is yieldingly latched in that position by the roller 275 engaging the beveled corner 291 or 292 of the latching plate 270. When the fluid pressure motor reaches the end of a power stroke, the increased pressure of the fluid within the cylinder acts through the kickoff plunger 315 to release the roller 275 from the latching plate 270, whereupon the lever is automatically returned to neutral position by the action of the compression spring 255 and the centering roller 248. In the case of a double acting cylinder, the kickoff plunger will operate to return the control lever 231 from either extreme position of operation, since the piston 126 moves in both directions under oil pressure. However, when a single acting cylinder is used, it moves under oil pressure only in one direction but is returned in the other direction by the weight of the implement and there is no fluid pressure available to actuate the kickoff plunger 315, hence the control lever 231 remains latched in the lowered position after the implement has been lowered and until the operator releases the lever manually. There is no necessity for the operator to return the lever to neutral, but it may be left in the extreme lowered position until he is ready to again raise the implement.

It should be pointed out that when the control lever 231 is swung to the latched position to effect a power stroke of the fluid pressure motor, the lever will be returned to the neutral position to relieve the pressure from the system in case the load exceeds the pressure of the spring 308 at any time during the stroke and not necessarily the end of the stroke. Hence, in case the implement encounters an obstruction during its adjustment, the valve plunger 69 will be returned to neutral position immediately, thereby warning the operator of the obstruction and relieving the fluid pressure in the system.

We do not intend our invention to be limited to the exact details shown and described herein, except as limited by the claims which follow.

We claim:

1. In hydraulic control mechanism for a fluid motor, a fluid supply duct therefor connectible to means for supplying fluid at substantially constant rate to said duct, an exhaust passage connected with said supply duct, a control valve connected in said duct and having a member shiftable from an inactive position, in which fluid is free to discharge through said exhaust passage, to a first operating position to close said exhaust passage to allow fluid pressure to build up in said duct to drive the motor, a restricted bleeder duct separate from said exhaust passage and leading from said supply duct for by-passing a portion of the fluid to cause the motor to operate at reduced speed, said valve member being shiftable from said first operating position to a second operating position in which said member keeps the exhaust passage closed and also closes said bleeder duct thereby causing the motor to operate at its maximum speed.

2. In hydraulic control mechanism for a fluid motor, a control valve comprising a valve cylinder and a plunger slidable therein, a supply duct through which fluid may be supplied at a substantially constant rate to said valve cylinder, a motor port connected to said cylinder to receive fluid therefrom, said cylinder having an exhaust port and an exhaust passage communicating therewith, said plunger being movable into a first position blocking said exhaust port to cause fluid pressure to build up in said motor port, a bleeder duct separate from the exhaust passage and connected to by-pass a portion of the fluid supplied to said motor port to reduce the rate of fluid flow through the latter, said bleeder duct communicating with a port in said cylinder through which the by-passed fluid is conducted to said exhaust passage, and said plunger being movable into a second position blocking both said exhaust port and said bleeder duct port, thereby causing all of said fluid to flow to said motor port to obtain maximum rate of fluid flow through the latter.

3. In hydraulic control mechanism, a control valve comprising a cylinder and a plunger shiftable axially therein, said plunger having a piston slidable in said cylinder, duct means including a motor port connected with one end of said valve cylinder, the intermediate portion of said cylinder being enlarged to provide an inlet chamber, in which said piston is normally disposed in inactive position, means for supplying fluid at substantially constant rate to said cylinder including a supply duct connected to said chamber, an exhaust passage connected to the other end of said cylinder and adapted to receive all of said fluid from said chamber when said piston is in said inactive position, means for shifting said plunger in said cylinder to slide said piston toward said exhaust passage to a first active position blocking said cylinder against flow of fluid therethrough to said passage and causing the fluid to flow to said motor port, a bleeder duct connected with said supply duct and having a port in said cylinder uncovered by said piston in its first position for by-passing a portion of the fluid to said exhaust passage for reducing the fluid flow to said motor port, said plunger being shiftable to a second active position in which said piston blocks said bleeder duct port thereby causing all of the fluid to flow to the motor port.

4. The combination set forth in claim 3 including the further provision of an adjustable valve in said bleeder duct for adjusting the resistance thereof to flow of fluid and thereby varying the rate of fluid flow to said motor port with said plunger in its first active position.

5. In hydraulic control mechanism, means providing a motor port, a control valve having a movable member shiftable in one direction from an inactive position to first and second operating positions for controlling fluid flow through the motor port, means for moving said valve comprising a rockshaft connected thereto, an actuating lever fixed to said rockshaft, and a centering mechanism for returning said valve to said inactive position, said centering mechanism comprising interengaging cam and roller members, one of said members being fixed to said rockshaft, a relatively stationary support for the other of said members, said cam member including a recess for receiving said roller member to hold said valve in said inactive position, a cam element shiftable relative to said cam member and having a shoulder against which said roller member is adapted to engage when said valve is in said first operating position, and means adjustably securing said element to said cam member to determine said first operating position of said valve, said roller member being adapted to roll over said shoulder and bear upon said cam element when said valve is in said second operating position, and spring means urging said cam and roller members in bearing contact with each other, the surfaces of said cam member and cam element being constructed and arranged to effect a return movement of said rockshaft to said inactive position by force exerted by said spring means.

6. The combination defined in claim 5, including the further provision of releasable means for yieldably retaining said rockshaft in said second operating position, and means responsive to a predetermined fluid pressure in said motor port for releasing said releasable means to permit said valve to be returned to said inactive position.

7. In hydraulic control mechanism, means providing a motor port, a control valve having a movable member shiftable from a central inactive position to first and second operating positions in each of two opposite directions for controlling fluid flow through the motor port, selectively, means for moving said valve comprising a rockshaft connected thereto, an actuating lever fixed to said rockshaft, and a centering mechanism for returning said valve to said inactive position, said centering mechanism comprising interengaging cam and roller members, one of said members being fixed to said rockshaft, a relatively stationary support for the other of said members, said cam member including an intermediately disposed recess for receiving said roller member to hold said valve in said inactive position, a pair of cam elements spaced on relatively opposite sides of said recess and shiftable relative to said cam member and each element having a shoulder against which said roller member is adapted to engage when said valve is in said first operating position on either side of said inactive positions, and means adjustably securing said elements to said cam member to determine said first operating positions of said valve in either direction of movement of said control lever, said roller member being adapted to roll over said shoulders and bear upon said cam elements in said second operating positions of said valve, respectively, and spring means urging said cam and roller members in bearing contact with each other, the surfaces of said cam member and cam element being constructed and arranged to effect a return movement of said rockshaft to said inactive position from operating positions in either direction of movement of said control lever, by force exerted by said spring means.

8. The combination defined in claim 7, including the further provision of releasable means for yieldably retaining said rockshaft in either of said second operating positions, and means responsive to a predetermined fluid pressure in said motor port for releasing said releasable means to permit said valve to be returned to said inactive position.

EMIL F. JIRSA.
MERLIN HANSEN.
CECIL W. BOPP.

REFERENCES CITED

The following references are of record in the file of this patent:

UNITED STATES PATENTS

| Number | Name | Date |
| --- | --- | --- |
| 1,245,912 | Hedden | Nov. 6, 1917 |
| 1,866,212 | Huxford et al. | July 5, 1932 |
| 1,995,052 | Bodenlos | Mar. 19, 1935 |
| 2,000,805 | West et al. | May 7, 1935 |
| 2,107,760 | McCormick et al. | Feb. 8, 1938 |
| 2,197,848 | Brown | Apr. 23, 1940 |
| 2,226,192 | Barrett | Dec. 24, 1940 |
| 2,274,527 | Buran | Feb. 24, 1942 |
| 2,308,727 | Temple | Jan. 19, 1943 |
| 2,324,866 | Mott | July 20, 1943 |
| 2,345,974 | Harrington | Apr. 4, 1944 |
| 2,361,801 | Towler | Oct. 31, 1944 |
| 2,380,839 | Hand | July 31, 1945 |
| 2,403,422 | Worthington | July 2, 1946 |